(12) United States Patent
Sherman et al.

(10) Patent No.: US 8,090,358 B2
(45) Date of Patent: Jan. 3, 2012

(54) METHODS AND COMPUTER-READABLE MEDIA FOR LOCATION-BASED TARGETED ADVERTISING

(75) Inventors: Stephen Sherman, Alpharetta, GA (US); Douglas O'Neil, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 850 days.

(21) Appl. No.: 11/504,912

(22) Filed: Aug. 16, 2006

(65) Prior Publication Data

US 2008/0195457 A1    Aug. 14, 2008

(51) Int. Cl.
  *H04L 29/06* (2006.01)
(52) U.S. Cl. .......... 455/414.3; 455/433; 348/108; 348/E5.063; 348/E5.18; 271/205
(58) Field of Classification Search .......... 455/414, 455/456, 404, 433; 379/67; 348/E7.063, 348/E5.108; 705/10, 14; 270/58, 52; 271/205, 271/225, 294, 184
See application file for complete search history.

(56) References Cited

U.S. PATENT DOCUMENTS

| | | | |
|---|---|---|---|
| 6,266,525 B1 | 7/2001 | Peterson | |
| 6,414,635 B1 | 7/2002 | Stewart et al. | |
| 6,650,902 B1 | 11/2003 | Richton | |
| 7,336,964 B2 | 2/2008 | Casey | |
| 2002/0038386 A1* | 3/2002 | Bhatia et al. | 709/250 |
| 2002/0046084 A1* | 4/2002 | Steele et al. | 705/14 |
| 2002/0077130 A1* | 6/2002 | Owensby | 455/466 |
| 2002/0083435 A1* | 6/2002 | Blasko et al. | 725/14 |
| 2002/0095333 A1* | 7/2002 | Jokinen et al. | 705/14 |
| 2002/0111154 A1* | 8/2002 | Eldering et al. | 455/414 |
| 2002/0176579 A1* | 11/2002 | Deshpande et al. | 380/270 |
| 2003/0023482 A1* | 1/2003 | Messner et al. | 705/14 |
| 2003/0222134 A1* | 12/2003 | Boyd | 235/375 |
| 2004/0158858 A1* | 8/2004 | Paxton et al. | 725/42 |
| 2005/0038876 A1 | 2/2005 | Chaudhuri | |
| 2005/0043060 A1* | 2/2005 | Brandenberg et al. | 455/558 |
| 2005/0078824 A1* | 4/2005 | Malinen et al. | 380/247 |
| 2005/0136884 A1* | 6/2005 | Reidelsturz et al. | 455/403 |
| 2005/0187823 A1 | 8/2005 | Howes | |
| 2005/0188062 A1 | 8/2005 | Li et al. | |
| 2006/0176289 A1* | 8/2006 | Horn | 345/204 |
| 2007/0061245 A1 | 3/2007 | Ramer et al. | |

(Continued)

OTHER PUBLICATIONS

U.S. Appl. No. 11/536,266, filed Sep. 28, 2006 entitled, "Neighborhood Level Information Delivery," Inventors: William L. Smith and Steven Tischer.

(Continued)

*Primary Examiner* — Nick Corsaro
*Assistant Examiner* — Mahendra Patel
(74) *Attorney, Agent, or Firm* — Hope Baldauff Hartman, LLC (57) ABSTRACT

Methods and computer-readable media are provided for providing targeted advertising to subscriber devices based on the location of the subscriber device and a set of advertiser-defined and subscriber-defined criteria. In one embodiment, the method includes retrieving location information that identifies the location of the subscriber device. Advertising is matched and transmitted to the subscriber device according to the location of the device. Matching advertising to the subscriber device is based on a set of advertiser-defined matching criteria that matches both the location of the subscriber device and a set of subscriber characteristics stored in a subscriber profile. A subscriber may define a set of parameters within the subscriber profile that further filters the set of matched advertisements.

19 Claims, 5 Drawing Sheets

U.S. PATENT DOCUMENTS

2007/0214041 A1* 9/2007 Patel et al. ............... 705/14
2008/0037723 A1* 2/2008 Milstein et al. ............ 379/88.12

OTHER PUBLICATIONS

U.S. Official Action dated Apr. 21, 2009 in U.S. Appl. No. 11/536,266.
U.S. Official Action dated Mar. 17, 2010 in U.S. Appl. No. 11/536,266.
U.S. Official Action dated Nov. 2, 2009 in U.S. Appl. No. 11/536,266.
U.S. Official Action dated Aug. 31, 2010 in U.S. Appl. No. 11/536,266.
Notice of Allowance/Allowability dated Nov. 26, 2010 in U.S. Appl. No. 11/536,266.

* cited by examiner

METHODS AND COMPUTER-READABLE MEDIA FOR LOCATION-BASED TARGETED ADVERTISING

TECHNICAL FIELD

This application relates generally to the field of targeted advertising. More specifically, the disclosure provided herein relates to the field of wirelessly distributing targeted advertisements according to the geographic location of the receiving device.

BACKGROUND

Marketing and advertising is an increasingly important focus of many businesses today. The number of potential customers in the world for any particular business is staggering. Companies often spend a significant portion of their revenue on advertising in order to attract more customers. However, advertising can be extremely expensive depending on the particular advertising medium, audience scope, and exposure time. In light of the tremendous expense associated with advertising coupled with the potential revenue generated by a successful advertisement, it can be crucial for a business to expose the right type of advertisement to the right type of consumer at the right time in order for an advertisement campaign to be worthwhile.

Targeted advertising is one method used by businesses to increase the effectiveness of their advertising campaigns. Targeted advertising includes focusing the advertising on consumers most likely to purchase the product or service that is the subject of the advertisement. The greater the ability that a company has for establishing target parameters and distributing advertisements according to those precise parameters, the more success the company is likely to have. For example, a company that sells 80% of its products to women between 18 and 25 years of age who work out more than three times a week may enjoy a greater return on their advertising expenses if they target women between 18 and 25 years of age who work out more than three times a week than they would if they mass mailed advertisements without regard for these parameters or if they only targeted women or if they only targeted women between 18 and 25 years of age.

However, there are many dynamic variables to a consumer's decision to purchase a product or service that are difficult for an advertiser to capitalize on. Many consumers decide to make a purchase without prior planning. This may occur because the consumer happens to be at a particular location and sees a product or service that they wish to purchase. A consumer may be window-shopping and may or may not decide to enter a store based on what they see or even what kind of mood they are in at the time. There is a need to be able to disseminate information to these consumers based not only on traditional targeting parameters, but also on dynamic parameters that may influence a consumer's desire to purchase a product or service at any particular time.

SUMMARY

According to one aspect of the disclosure presented herein, methods and computer-readable media are provided for selecting and transmitting targeted advertising to subscriber devices based on the location of the subscriber device and a set of advertiser-defined and subscriber-defined criteria. According to one implementation, the method includes retrieving location information that identifies the location of the subscriber device. The location information may be derived from a Global Positioning System ("GPS") receiver located within the subscriber device, from cellular signal triangulation within a cellular network, or from a known location of a fixed device that detects the presence of the subscriber device within a predetermined proximity. Advertising is matched and transmitted to the subscriber device according to the location of the device. Matching advertising to the subscriber device is based on a set of advertiser-defined matching criteria that corresponds to both the location of the subscriber device and a set of subscriber characteristics stored in a subscriber profile. A subscriber may define a set of parameters within the subscriber profile that further filters the set of matched advertisements. The targeted advertisements may be recalled upon the detection of a recall event, to include the expiration of a predetermined time period or a change in location of the subscriber device.

According to other aspects of the disclosure provided herein, a method includes retrieving location information that identifies the location of a subscriber device. At least one advertisement is selected from a number of advertisements based on the location of the subscriber device as well as a subscriber profile associated with the subscriber device. The selected advertisement is transmitted to the subscriber device. Another aspect includes determining the current time of day and selecting the advertisement based on the time of day.

According to another implementation, a computer-readable medium provides instructions to a computer to retrieve location information that identifies the location of a wireless subscriber device. At least one advertisement is identified for transmission to the subscriber device and transmitted to the device. The identification of advertisements for transmission is based upon a subscriber profile associated with the subscriber device and the location of the subscriber device. According to one aspect, the subscriber device comprises a cellular telephone and the subscriber profile comprises identification of the subscriber, demographic data corresponding to the subscriber, and subscriber preferences for receiving advertisements.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The following detailed description is directed to methods and computer-readable media for dynamically providing targeted advertising to a subscriber device according to the geographic location of the device. In the following detailed description, references are made to the accompanying drawings that form a part hereof, and which are shown by way of illustration specific embodiments or examples.

As discussed briefly above, targeted advertising may be extremely beneficial, but is typically limited to targeting consumers based on relatively static parameters. For example, typical targeting parameters include certain demographic data corresponding to the targeted consumers as well as location information typically limited to the static location of residential addresses corresponding to the target consumers. In contrast, the disclosure presented herein provides for advertising targeted to consumers based on the location of the consumer at any given time and may be delivered to the consumer at the instance that the consumer is within a proximity to the targeting business. Consumers interested in such a service subscribe to the fee-based service and establish a subscriber profile that provides information that allows the targeted advertising system to filter advertisements beyond the location of the subscriber according to the preferences of both the advertisers and the subscriber. Targeted advertisements are then pushed to a subscriber device associated with the subscriber as the subscriber travels from one location to another, without the need for the subscriber to request advertisements and without receiving a large quantity of non-pertinent advertisements. It should be understood that the term "advertisement" as described herein encompasses all information that a business entity would like to convey to a consumer. This information may be a discount on products or services or may simply be an announcement regarding the business. Referring now to the drawings, in which like numerals represent like elements through the several figures, aspects of the methods and computer-readable media provided herein will be described.

Figure 1:
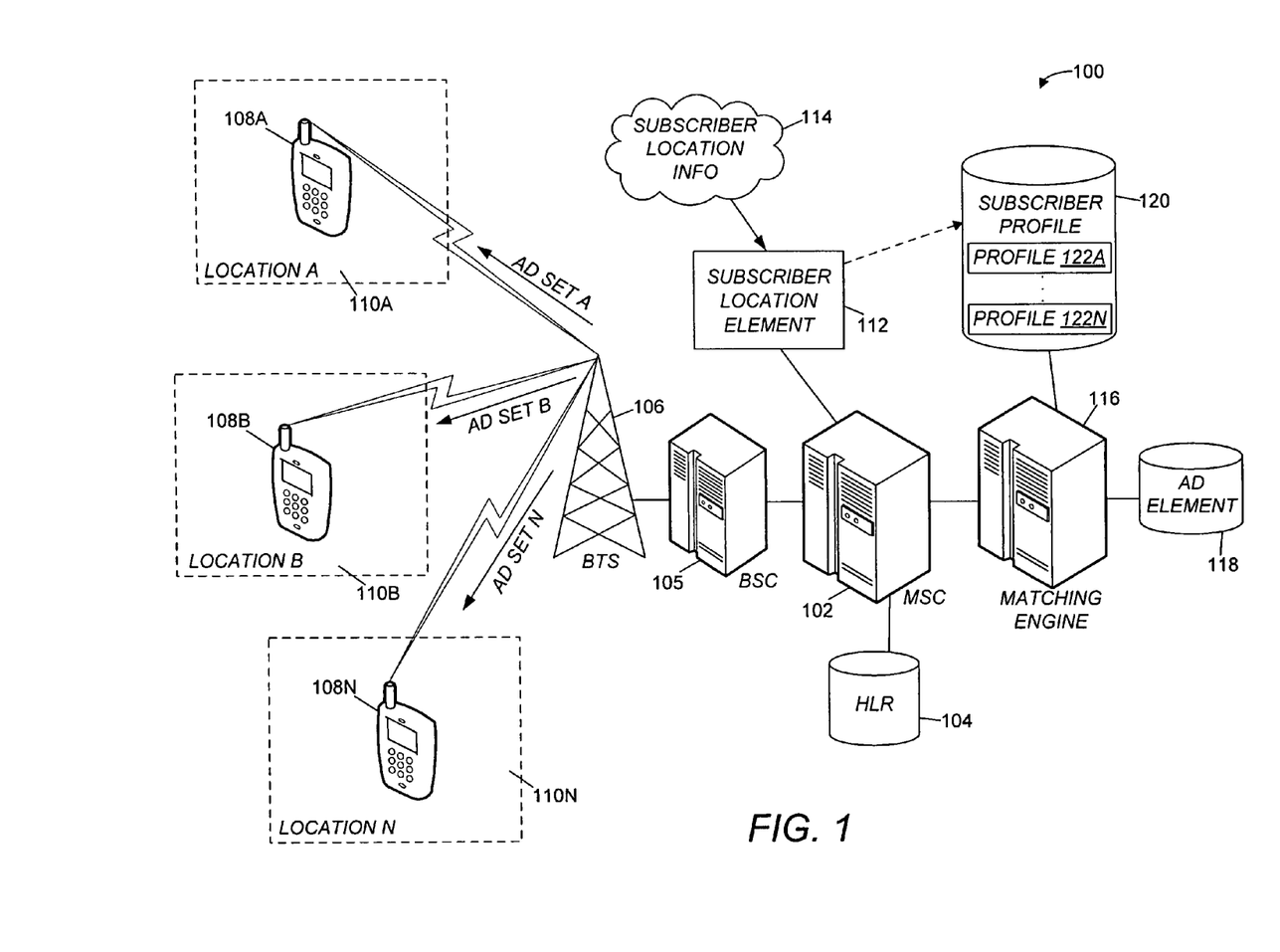
FIG. 1 is a block diagram showing aspects of an illustrative operating environment for the disclosure presented herein.

FIG. 1 shows an illustrative operating environment for a targeted advertising system 100 according to examples in the disclosure provided herein. Aspects of the disclosure provided herein operate in conjunction with a cellular network, shown in simplified form in FIG. 1 as including a Mobile Switching Center ("MSC") 102, Home Location Register ("HLR") 104, Base Station Controller ("BSC") 105, and Base Transceiver Subsystem ("BTS") 106. It should be understood that the cellular network depicted in FIG. 1 is greatly simplified for illustrative purposes. It will also become apparent from the below description that the disclosure presented herein is not limited to use with a cellular network, but may operate with any communications network that allows for communication between an advertisement element 118 and subscriber devices 108A-108N via a matching engine 116, including WIFI, WIMAX, or a fixed communications network.

In addition to the cellular network, the targeted advertising system 100 includes the subscriber devices 108A-108N, which are geographically located at locations 110A-110N, respectively. The subscriber devices 108A-108N may be cellular telephones, personal data assistants, pagers, laptop computers, or any other type of wireless communication device capable of receiving data from a communications network and displaying or otherwise communicating this data or a subset of this data to a user. Additionally, the targeted advertising system 100 includes the matching engine 116, the advertisement element 118, and a subscriber profile database 120 for storing subscriber profiles 122A-122N, all of which will be described below with respect to FIG. 2.

The targeted advertising system 100 utilizes a subscriber location element 112 for collecting and tracking geographic location information 114 associated with the subscriber devices 108A-108N. The subscriber location element 112 may utilize any known technology for determining the geographic location of a subscriber device 108A-108N, collecting the location information 114, and updating the location information 114 as the subscriber device 108 travels from one location to another. For example, many subscriber devices 108A-108N contain a Global Positioning System ("GPS") receiver in order to receive location information from a GPS satellite network. As a subscriber device 108A-108N is activated and registered on a cellular network, the subscriber device 108 determines its location utilizing the GPS receiver and transmits its location information 114 to the subscriber location element 112. The location information 114 is received by the subscriber location element 112 where it is then stored and updated.

Alternatively, the locations 110A-110N of the subscriber devices 108A-108N may be determined utilizing the known locations of each BTS 106 defining the various cells of the network. By determining the signal strength of a subscriber device 108 at multiple BTSs 106 within a cell, the location of the subscriber device 108 may be determined via triangulation techniques. This method of location determination may be combined with GPS technology to ensure the consistent collection of location information 114 and to provide redundant location determination systems. QUALCOMM, Inc. utilizes Position Determination Entities ("PDEs") to collect location information utilizing similar techniques to those described above.

It should be appreciated that the subscriber location element 112 may store the location information 114 in a database associated with the subscriber location element 112. This database may be located at the subscriber location element 112, or may be remote. As will be described below, the subscriber location information 114 associated with each subscriber device 108A-108N may be stored as part of a corresponding subscriber profile 122A-122N within the subscriber profile database 120. The subscriber profiles 122A-122N may alternatively be stored within the advertisement element 118, the HLR 104, or any other database associated with the matching engine 116 or the corresponding cellular or other communications network. The matching engine 116 utilizes this location information, as well as other subscriber characteristics and preferences stored within the subscriber profile 122A-122N to match one or more advertisements from the advertisement element 118 to the subscriber and to subsequently push the resulting targeted advertisements to each appropriate subscriber device 108A-108N. It should be understood that the matching engine 116 may be a server computer or other computing device having a processor capable of executing stored program code for performing the tasks described herein.

Prior to describing components of the targeted advertising system 100 in detail, a functional example of the system 100 will be given. Looking at FIG. 1, a subscriber having the subscriber device 108A travels to location 110A. Location information 114 associated with location 110A is received at the subscriber location element 112 and the subscriber profile 122A associated with the subscriber having the subscriber device 108A is updated with this new location information 114. The matching engine 116 detects this location update and matches one or more advertisements to the subscriber associated with the subscriber device 108A based on the location 110A and other characteristics within the subscriber profile 122A as will be described below with respect to FIG. 2. The matched advertisements are retrieved from the advertisement element 118 and transmitted to the subscriber device 108A as advertisement set A. This process is repeated for the subscriber device 108B at location 110B and for the subscriber device 108N at location 110N as well as for subscriber device 108A if it were to relocate to location 110B or 110N. Optionally, the targeted advertising system 100 may include a security element that would require authorization prior to allowing access to the subscriber profiles 122A-122N, the advertising element 118, or the subscribe location element 112.

Figure 2:
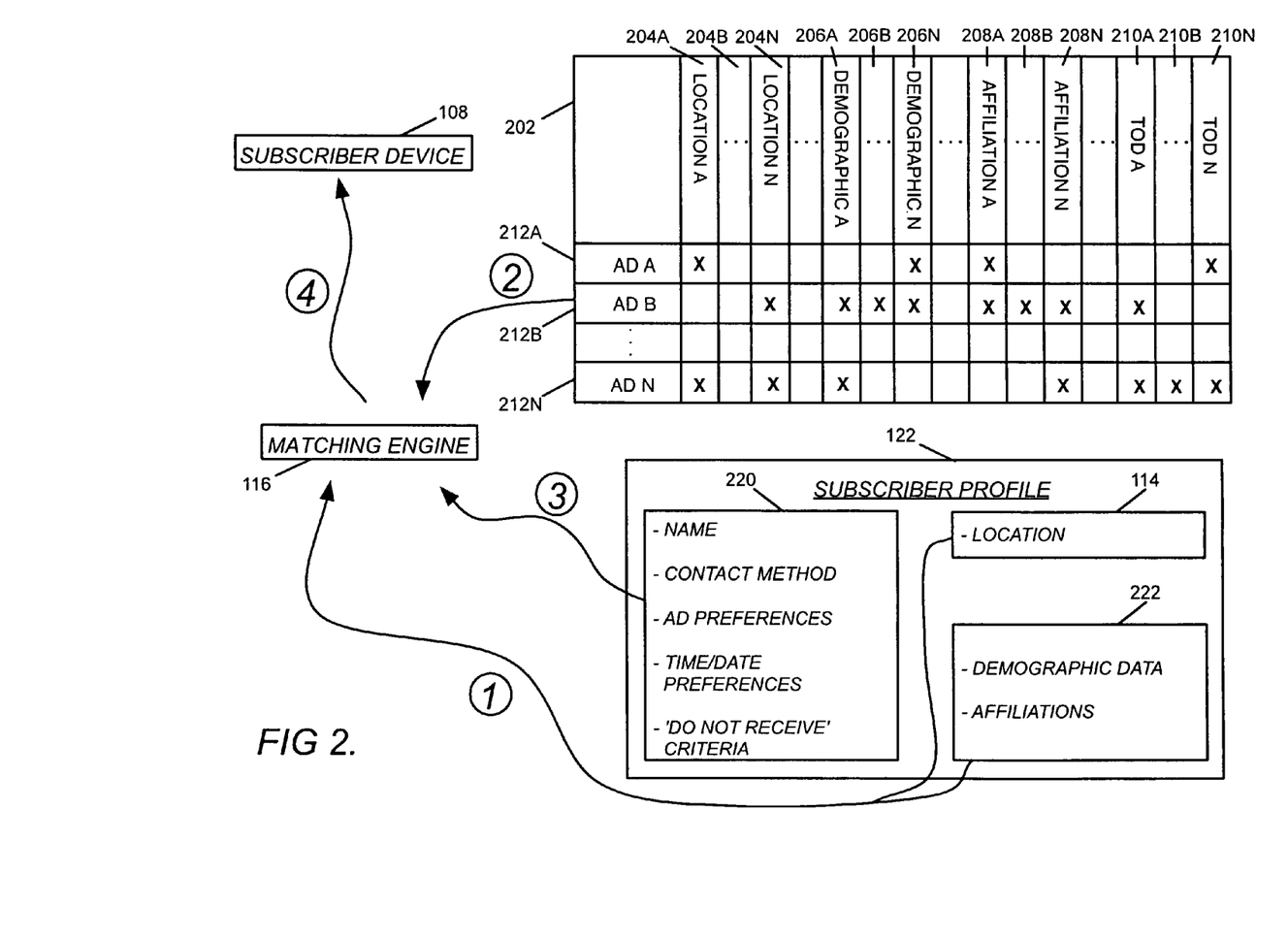
FIG. 2 is a functional diagram showing an illustrative advertisement source profile and subscriber profile, as well as the flow of information between these components, a matching engine, and a subscriber device according to one embodiment presented herein.

Turning now to FIG. 2, components of the advertisement element 118 and the subscriber profile database 120 will be described as well as the advertisement matching process utilizing these components. The advertisement element 118 includes the advertisement content as well as matching criteria used to target the advertisement content to appropriate subscribers. One method for matching the advertisements to a subscriber using the applicable matching criteria is to use an advertisement source profile 202. It should be appreciated that any method of sorting advertisements according to various criteria may be used. Program code may be used that when executed, searches a database with stored advertisements for advertisements having tags associated with various matching criteria.

The advertisement source profile 202 includes advertisement identifications 212A-212N and matching criteria 204A-210N. The matching criteria 204A-210N includes location information 204A-204N corresponding to locations A-N, demographic information 206A-206N corresponding to the demographic criteria A-N, affiliation information 208A-208N corresponding to the affiliation criteria A-N, and time of day ("TOD") information 210A-210N corresponding to the TOD criteria A-N. It should be understood that the matching criteria 204A-210N is not limited to the criteria shown in the advertisement source profile 202. Any amount and type of matching criteria may be utilized according to the preferences of the advertisers or the provider of the targeted advertisement service described herein. It should also be understood that the advertisements 212A-212N and the matching criteria 204A-210N are dynamic in that the participating advertisers may alter this information at any time and for any length of time. For example, an advertiser may wish to push out advertisements that provide discounts to a certain demographic at a certain location for only the next two hours. The advertiser may gain access to the advertisement source profile 202 and edit the appropriate content, which will trigger the matching engine 116 to make the necessary advertisement matches and transmit the content. At the end of the two hours, the advertiser may again gain access to the advertisement source profile 202 and edit the content back to its previous form.

The location information 204A-204N includes entries for each location for which an advertisement should be associated. The location may define a geographical area encompassing a single business or a larger more generalized geographical area. Any format may be used for defining the location including but not limited to GPS coordinates, latitude and longitude coordinates, and street addresses. Some conversion may be necessary by the matching engine 116 of this location format or the format of the location information 114 received by the subscriber location element 112 in order to reconcile differing formats. Advertisements may be associated with one or more locations. For example, advertisement 212A is associated with location A, advertisement 212B is associated with location N, and advertisement N is associated with both location A and location N. This association, as well as the association of advertisement content with other matching criteria may be determined by the advertiser according to a fee schedule. The more matching criteria that any given advertisement is limited to, the fewer the number of matches that will be made, but the greater the likelihood for success of the advertisement. Therefore, as a simple example using only the location information 204A-204N as matching criteria, when a subscriber enters location A, advertisements 212A and 212N would be pushed to the corresponding subscriber device.

The demographic information 206A-206N includes entries for each demographic criterion for which an advertisement should be associated. Any type of demographic criteria may be used, including subscriber age, gender, income, purchase habits, or any other desired criteria that is capable of being tracked. This type of information is useful to advertisers in targeting specific groups such as teens and the elderly, as well as those in specific career fields and having certain hobbies. Without any other matching criteria being used other than the location information 204A-204N and demographic information 206A-206N for clarity, when a subscriber satisfying the demographic criteria N enters location A, advertisement 212A would be pushed to the corresponding subscriber device, but not advertisement 212N since it only targets subscribers satisfying demographic criteria A.

Similarly, the affiliation information 208A-208N includes entries for each affiliation for which an advertisement may be associated. The affiliation criteria A-N might include membership information in organizations such as the AMERICAN AUTOMOBILE ASSOCIATION, members of particular grocery or retail store VIP or discount programs such as those at PUBLIX, KROGER, or SAM'S CLUB, and membership in professional associations such as a State Bar Association. The benefit of targeting advertisements according to these affiliations and any others is that an affiliation with an organization may indicate an interest of the subscriber having the affiliation and may therefore show a propensity to purchase a certain type of product or service. Looking at the advertisement source profile 202, as a simple example of the matching process using only the affiliation information 208A-208N and the location information 204A-204N for clarity, when a subscriber satisfying the affiliation criteria A enters location N, advertisement 212B would be pushed to the corresponding subscriber device, but not advertisement 212N since the advertiser has chosen to only target subscribers satisfying affiliation criteria N.

The TOD information 210A-210N corresponding to TOD criteria A-N. Advertisers may establish a TOD that they would like to push one or more advertisements that satisfy all of the other matching requirements, if any, to a subscriber. This is particularly useful if the product or service being advertised has specific peak or slow times that the advertiser would like to take advantage of or try to correct. For example, a restaurant owner in an area of town having a lot of competition for lunch might wish to push coupons to subscribers within the area of her restaurant, or within the area of a competitor's restaurant, during the peak lunch hour. Similarly, a business owner who enjoys steady retail business during the day with the exception of a couple of down hours in the middle of the day may wish to offer discounts or incentives to subscribers during those down hours in an attempt to increase business. Alternatively, advertisers may choose to select all of the TOD criteria A-N for their advertisements if they do not want to specifically target certain time periods.

As an example, assuming for clarity that there is no other matching criteria being used other than location information 204A-204N and the TOD information 210A-210N, when a subscriber enters location A at a time that satisfies the TOD criteria A, then she would receive advertisement 212N since the associated advertiser chose to push advertisement 212N at all times. The subscriber would not receive advertisement 212A since the associated advertiser chose to push advertisement 212A only during the time that satisfies the TOD criteria N. The subscriber would also not receive advertisement 212B since the associated advertiser chose to push the advertisement only to those subscribers within the location N. It should be appreciated that any other timing criteria may be used in addition to TOD or in place of TOD, including specific calendar days, specific days of the week, and specific months.

The matching criteria 204A-210N are defined by the advertisers for targeting a particular subset of subscribers. To determine if an advertisement matches a subscriber, the matching engine 116 must have access to subscriber characteristics 222 that correspond to the matching criteria 204A-210N defined by the advertisers. These subscriber characteristics 222 are stored within a subscriber profile 122. As discussed above with respect to FIG. 1, the subscriber profile 122 may be stored within a subscriber profile database 120, which is associated with either the matching engine 116, the advertisement element 118, or a component of a cellular or other communications network. Each subscriber establishes a subscriber profile 122 upon initiation of the targeted advertising service. As part of the subscriber profile 122, the subscriber is asked to input the subscriber characteristics 222 that coincide with the matching criteria 204A-210N defined by the advertisers. As the matching criteria 204A-210N changes, a subscriber may be prompted to update his profile. It should be understood that the subscriber characteristics 222 and other information within the subscriber profile 122 may be updated at any time and in any manner. The subscriber may initiate changes to the subscriber profile, or the subscriber may be prompted to do so at a particular time or on a recurring basis. Changes to the subscriber profile 122 may be made online using a network browser, via email, via text message, by mailing a completed form, via a telephone call, or using any other communication method.

In addition, a subscriber profile 122 may be accessible to third parties so that it may be updated automatically as a subscriber's characteristics 222 change. For example, the provider of the targeted advertising system 100 may have an agreement with a third party such as SAM'S CLUB. Whenever a party becomes a member at SAM'S CLUB, notification of the membership will be transmitted to the targeted advertising system provider. The targeted advertising system provider may then update the appropriate subscriber profile 122 with the new SAM'S CLUB membership information as an affiliation that may initiate targeted advertisements related to the new membership.

As discussed briefly above, the location information 114 received from the subscriber location element 112 may be stored within the subscriber profile and updated by the subscriber location element 112 upon detection of a change in location of the subscriber device 108. Alternatively, the location information 114 may be stored within the subscriber location element 112, within the advertisement element 118, or anywhere else within the targeted advertising system 100. When the location information 114 is stored outside of the subscriber profile 122, the matching engine 116 must retrieve that information from its stored location prior to initiating an advertisement match.

Also stored within the subscriber profile 122 is a set of subscriber-defined criteria 220. The subscriber-defined criteria 220 includes a set of parameters that the subscriber has chosen to further define the conditions surrounding her receipt of information from the targeted advertising system 100. For example, the subscriber-defined criteria 220 may include a preferred method of contact. The method may include device and/or advertisement medium. For example, the subscriber may wish to receive advertisement content on a PDA even though the subscriber device that initiated the location information 114 and ultimately the advertisement content is a cellular telephone. The subscriber may also wish to receive the advertisement content as rich media, text only, audio, or any applicable content medium.

The subscriber-defined criteria 220 may also include preferences for the type of advertisements received. The subscriber may wish to only receive coupons, instead of receiving advertisements that promote a product or service without offering a discount. The subscriber may choose to set up her subscriber profile 122 such that advertisements are only sent at preferred times or dates. Further, the subscriber-defined criteria 220 may establish conditions under which the subscriber does not want to receive advertisements. For example, the subscriber may not want to receive advertisements when in a particular geographic location. This would eliminate the receipt of the same or similar advertisements every time that the subscriber entered a routinely entered location. It should be understood that any other subscriber-defined criteria may be included within the subscriber profile 122. These criteria may preferably be turned on or off or changed at the desire of the subscriber.

The subscriber-defined criteria 220 is used to dictate the conditions under which the subscriber receives advertisements and to filter certain advertisements that have been matched to a subscriber so that they do not reach the subscriber. To do so, the subscriber-defined criteria 220 must be applied to the advertisements after the matching based on location and subscriber characteristics 222 has been completed.

FIG. 2 shows the simplified matching process according to one embodiment described herein. A detailed discussion of the matching process will be presented below with respect to FIGS. 3A-3C. First, the matching engine 116 receives location information 114 from the subscriber profile 122 or elsewhere if not stored within the subscriber profile. The initial matching of advertisements to a subscriber is based on the location of the subscriber device 108 associated with the subscriber. Either simultaneously with the location information 114, or after an initial match based on the location information 114 is complete, the matching engine 116 retrieves the subscriber characteristics 222 from the subscriber profile 122 associated with the subscriber.

Second, these subscriber characteristics 222 are compared to the matching criteria 206A-208N to further filter the advertisements that were matched to the subscriber based on location alone. The remaining matched advertisements may be further filtered by the matching engine 116 according to advertiser-defined criteria such as TOD information 210A-210N. The resulting targeted advertisements are retrieved by the matching engine 116. Third, the matching engine 116 retrieves the subscriber-defined criteria 220 and further filters the targeted advertisements according to the criteria. The resulting targeted advertisements are then transmitted by the matching engine 116 to the subscriber device 108 according to the preferred method as established in the subscriber profile 122. It should be understood that this process is not limited to the order discussed herein. The matching engine 116 matches advertisements within the advertisement element 118 to a subscriber according to the location of the associated subscriber device 108, the matching criteria 206A-210N in light of the subscriber characteristics 222, and the subscriber-defined criteria 220. The disclosure presented herein is not limited to the described sequence in which each set of criteria is retrieved or utilized.

Figure 3A:
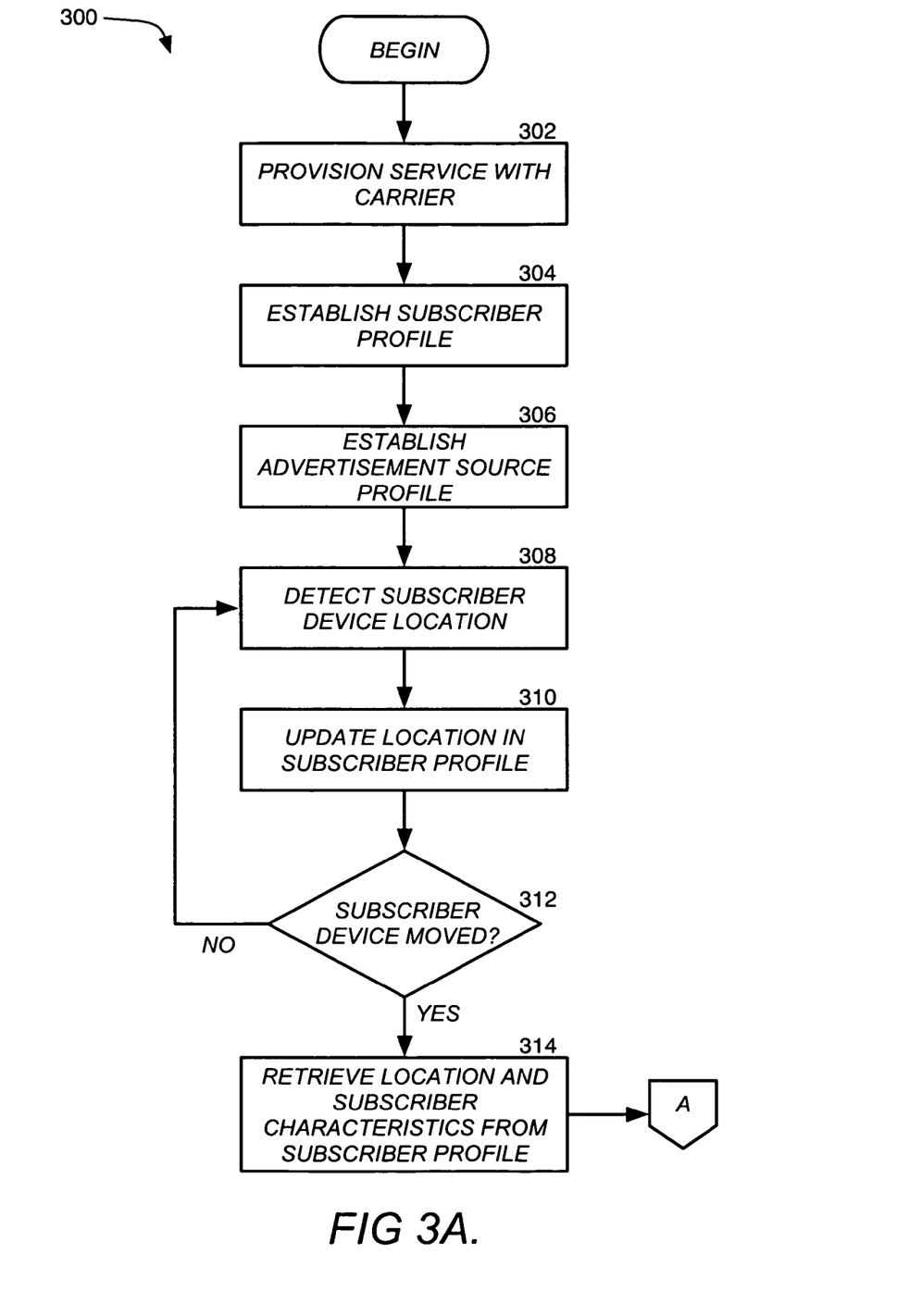
FIGS. 3A-3C show a flow diagram illustrating a method provided herein for dynamically presenting targeted advertising to a subscriber device according to the geographic location of the subscriber device.
Figure 3B:
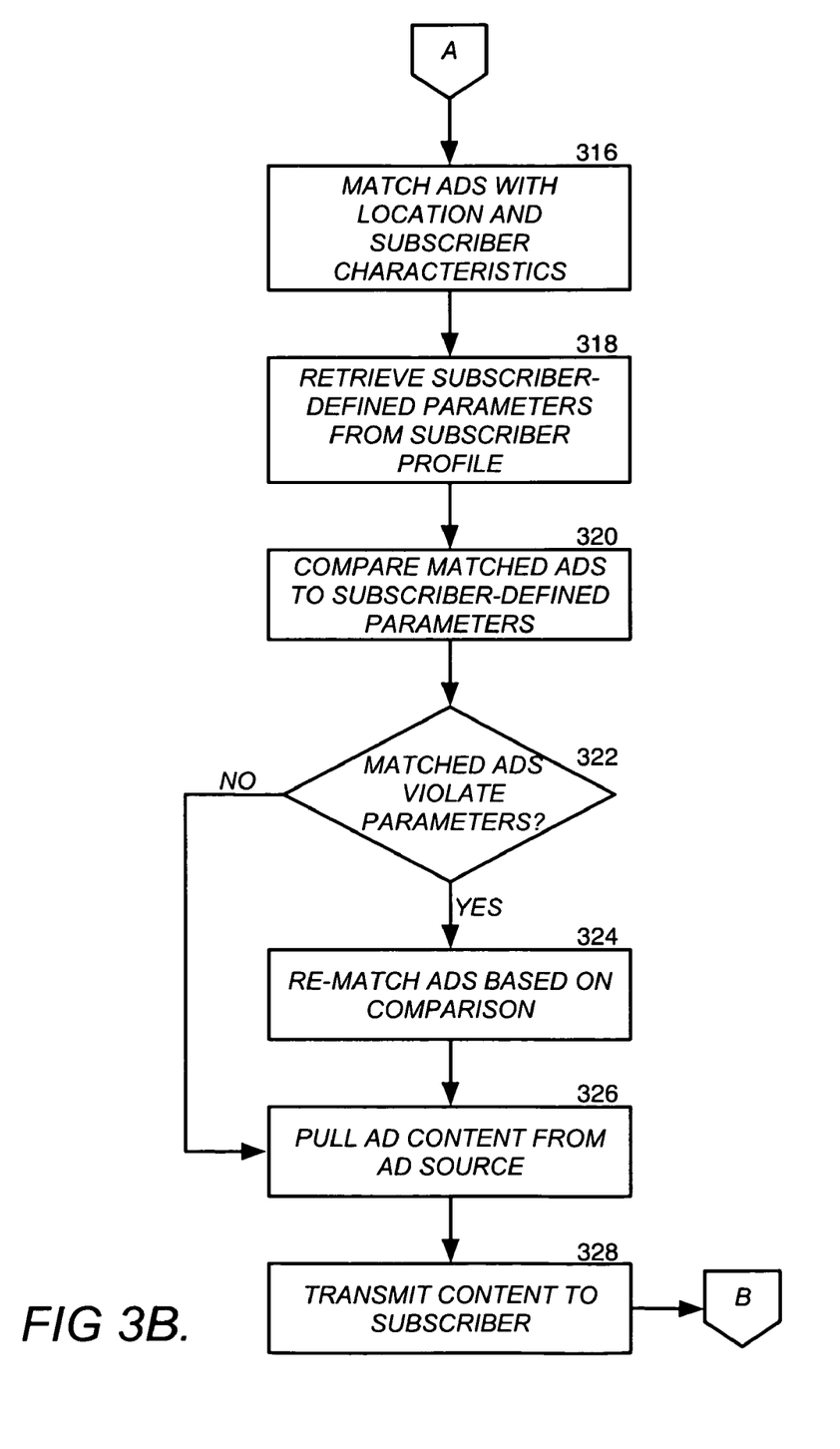
Figure 3C:
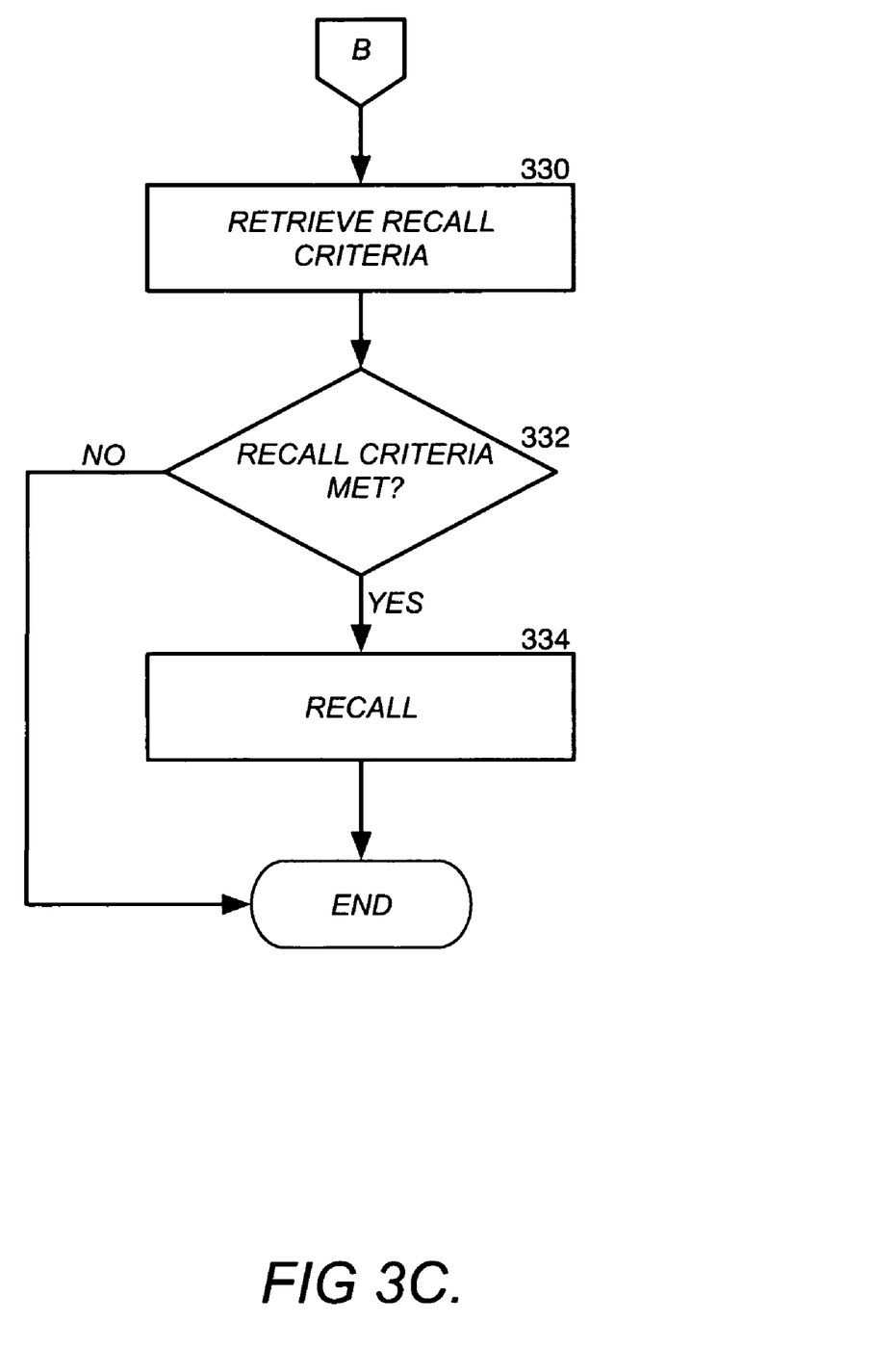

Referring now to FIGS. 3A-3C, an illustrative routine 300 will be described for dynamically presenting targeted advertising to a subscriber device according to the geographic location of the subscriber device as well as various advertiser-defined and subscriber-defined matching criteria. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 300 begins at operation 302, where a subscriber provisions service with a carrier. The carrier may be a telephone service provider or a third party. The routine 300 continues to operation 304, where a subscriber profile is established. As described above, the subscriber profile 122 includes subscriber identification information 212, subscriber characteristics 222, subscriber-defined criteria 220, and location information 114 that identifies the current location of the subscriber device 108. The routine 300 continues from operation 304 to operation 306, where an advertisement source profile 202 is established. The advertisement source profile 202 includes the advertisement content, matching criteria as defined by the advertisers presenting the advertisement content, and a defined correlation between the advertisement content and the matching criteria. From operation 306, the routine 300 continues to operation 308, where the location of the subscriber device 108 is detected. As described above, this detection can occur in any number of ways, including GPS technology, cellular signal triangulation, and detection of the subscriber device within a predetermined proximity of a fixed device with known location.

The routine 300 continues to operation 310, where the location information 114 corresponding to the subscriber device 108 is updated by the subscriber location element 112 within the subscriber profile 122 or other stored location. From operation 310, the routine 300 proceeds to operation 312, where a determination is made by the matching engine 116 as to whether the subscriber device 108 has moved. This determination is made by comparing the updated location information 114 with previously stored location information 114. It should be appreciated that the amount of movement of the subscriber device 108 required for a determination that the device 108 moved may vary depending on the carrier or participating advertisers. If the subscriber device 108 has not moved, the routine 300 returns to operation 308 and the routine 300 continues until an new location has been detected. If the subscriber device 108 is determined to have moved at operation 312, then the routine 300 continues to operation 314, where the location information 114 and the subscriber characteristics 222 are retrieved from the subscriber profile 122 by the matching engine 116.

From operation 314, the routine 300 continues to operation 316, where the matching engine 116 matches advertisements 212A-212N with the subscriber based on the location information 114 and the subscriber characteristics 222 as applied to the matching criteria 204A-210N of the advertisement source profile 202. From operation 316, the routine 300 proceeds to operation 318, where the matching engine 116 retrieves the subscriber-defined parameters 220 from the subscriber profile 122. The advertisements that were successfully matched to the subscriber at operation 316 are compared by the matching engine 116 to the subscriber-defined parameters 220 at operation 320. The matching engine 116 determines at operation 322 as to whether any of the matched advertisements violate any of the subscriber-defined parameters 220. If so, the routine 300 continues to operation 324, where the matching engine 116 filters out any violating advertisements to arrive at a targeted set of advertisements for the subscriber. The resulting set of targeted advertisements is pulled from the advertisement source at operation 326 by the matching engine 116. If, at operation 322, the matching engine 116 determines that none of the matched advertisements violate the subscriber-defined parameters 220, the routine continues to operation 326, where the resulting set of targeted advertisements are pulled from the advertisement source by the matching engine 116. It should be understood that the matching can be completed prior to pulling the advertisement content, or the advertisements may be pulled prior to matching, with the violating advertisements discarded or simply not transmitted to the subscriber device 108.

From operation 326, the routine 300 continues to operation 328, where the targeted advertisements are transmitted to the subscriber by the matching engine 116. The routine 300 proceeds to operation 330, where any recall criteria associated with the targeted advertisements is retrieved by the matching engine 116. According to the disclosure presented herein, advertisements that have been delivered to a subscriber device 108 may be optionally recalled by the carrier or advertiser according to a set of recall criteria. An advertiser may choose to push an advertisement to subscribers for only a short period of time, i.e., a lunch hour. At the end of this predetermined period of time, the advertisement may simply expire, or the content of the advertisement may be pulled or deleted from the subscriber device 108. This may be accomplished in any number of ways, including inserting program code with the advertisement content that will delete the advertisement content after a predetermined period of time or upon a command transmitted from the matching engine 116 or other targeted advertising system 100 component. It should be understood that an advertisement may be recalled based on any event, and is not limited to recall based on a period of time expiring. For example, an advertisement may be recalled upon the relocation of the subscriber device 108 from one location to another. From operation 330, the routine 300 continues to operation 332, where the matching engine 116 determines whether any of the recall criteria has been met. If so, then the corresponding advertisement is recalled by the matching engine 116 at operation 334 and the routine 300 ends. If the recall criteria have not been met, then the routine 300 ends.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing targeted advertising to a subscriber device that is associated with a subscriber, the method comprising:
    retrieving location information identifying a location of the subscriber device;
    retrieving a subscriber characteristic and a subscriber-defined parameter from a subscriber profile associated with the subscriber, the subscriber-defined parameter comprising a do not receive criterion that defines a condition under which the subscriber does not agree to receive advertisements;
    matching an advertisement to the subscriber device according to the location, the subscriber characteristic, the subscriber-defined parameter, and a time period specified by a provider of the advertisement, wherein
        the time period comprises one of a peak business time period and a slow business time period, and
        the advertisement comprises advertisement content and program code, the program code being configured to delete the advertisement content after the time period expires; and
    transmitting the advertisement to the subscriber device, wherein the advertisement content is deleted responsive to an expiration of the time period in accordance with the program code.

2. The method of claim 1, wherein the location information is derived from a Global Positioning System receiver located within the subscriber device.

3. The method of claim 1, wherein the location information is derived from cellular signal triangulation within a cellular network.

4. The method of claim 1, wherein the location information is derived from a known location of a fixed device that detects a presence of the subscriber device within a predetermined proximity.

5. The method of claim 1, wherein the subscriber characteristic comprises subscriber demographic data.

6. The method of claim 1, wherein matching the advertisement to the subscriber device further comprises matching the advertisement according to a further subscriber-defined parameter comprising an advertisement content-type preference of the subscriber.

7. The method of claim 1, further comprising determining whether the provider associated with the advertisement is authorized to access the subscriber profile.

8. The method of claim 1, wherein the subscriber device is a cellular telephone.

9. The method of claim 1, wherein matching the advertisement to the subscriber device further comprises matching the advertisement according to a further subscriber-defined parameter comprising a preferred method of contact of the subscriber.

10. A non-transitory computer-readable storage medium having computer-executable instructions stored thereon which, when executed by a computer, cause the computer at least to:
    retrieve location information identifying a location of a subscriber device;
    retrieve a subscriber characteristic and a subscriber-defined parameter from a subscriber profile associated with the subscriber, the subscriber-defined parameter comprising a do not receive criterion that defines a condition under which the subscriber does not agree to receive the advertisement;
    match an advertisement to the subscriber device according to the location, the subscriber characteristic, the subscriber-defined parameter, and a time period specified by a provider of the advertisement, wherein
        the time period comprises one of a peak business time period and a slow business time period, and
        the advertisement comprises advertisement content and program code, the program code being configured to delete the advertisement content after the time period expires; and
    transmit the advertisement to the subscriber device, wherein the advertisement content is deleted responsive to an expiration of the time period in accordance with the program code.

11. The computer-readable medium of claim 10, wherein the subscriber characteristic comprises at least one of the following:
    subscriber demographic data; and
    affiliation data.

12. The computer-readable medium of claim 10, further having instructions stored thereon which, when executed by the computer, cause the computer to retrieve a further subscriber-defined preference comprising at least one of the following:
    an advertisement content-type preference of the subscriber; and
    a preferred method of contact of the subscriber.

13. A matching engine for providing targeted advertising to a subscriber device, the matching engine comprising:
    a network interface;
    a processor operatively coupled to the network interface; and
    a memory operatively coupled to the processor, the memory being configured to store instructions that, when executed by the processor, cause the processor to
        retrieve, via the network interface, location information identifying a location of the subscriber device,
        retrieve, via the network interface, a subscriber characteristic and a subscriber-defined parameter from a subscriber profile associated with a subscriber, the subscriber-defined parameter comprising a do not receive criterion that defines a condition under which the subscriber does not agree to receive advertisements,
        match an advertisement to the subscriber device according to the location, the subscriber characteristic, the subscriber-defined parameter, and a time period specified by a provider of the advertisement, wherein
            the time period comprises one of a peak business time period and a slow business time period, and
            the advertisement comprises advertisement content and program code, the program code being configured to delete the advertisement content after the time period expires, and
        transmit, via the network interface, the advertisement to the subscriber device, wherein the advertisement content is deleted responsive to an expiration of the time period in accordance with the program code.

14. The matching engine of claim 13, wherein the subscriber characteristic comprises at least one of the following:
   subscriber demographic data; and
   affiliation data.

15. The matching engine of claim 13, wherein the memory is further configured to store instructions that, when executed by the processor, cause the processor to retrieve a further subscriber-defined parameter, the further subscriber-defined parameter comprising at least one of the following:
   an advertisement content-type preference of the subscriber; and
   a preferred method of contact of the subscriber.

16. The method of claim 1, wherein the subscriber characteristic comprises affiliation data.

17. The method of claim 1, wherein the condition under which the subscriber does not agree to receive the advertisement comprises one of a particular geographic location and a particular time.

18. The computer-readable medium of claim 10, wherein the condition under which the subscriber does not agree to receive the advertisement comprises one of a particular geographic location and a particular time.

19. The matching engine of claim 13, wherein the condition under which the subscriber does not agree to receive the advertisement comprises one of a particular geographic location and a particular time.

* * * * *